United States Patent [19]

Theyse

[11] 4,171,491
[45] Oct. 16, 1979

[54] PLANT FOR GENERATING AND ACCUMULATING ELECTRIC ENERGY WITH THE AID OF WIND POWER OR SOLAR ENERGY

[75] Inventor: Frederik H. Theyse, Bensberg-Herkenrath, Fed. Rep. of Germany

[73] Assignee: Stichting Energieonderzoek Centrum Nederland, The Hague, Netherlands

[21] Appl. No.: 749,269

[22] Filed: Dec. 10, 1976

[30] Foreign Application Priority Data

Dec. 18, 1975 [NL] Netherlands .......................... 7514747

[51] Int. Cl.² .............................................. H02K 7/02
[52] U.S. Cl. .................................... 290/1 R; 290/44; 322/4
[58] Field of Search ................ 74/572; 416/60; 290/1, 290/55, 44, 42, 43, 53, 54; 318/150, 161; 322/4; 310/24

[56] References Cited

U.S. PATENT DOCUMENTS

| 261,531 | 7/1882 | Buell | 290/4 R |
| 554,138 | 2/1896 | Negbaur | 290/55 |
| 3,158,750 | 11/1964 | Roes | 322/4 |
| 3,970,917 | 7/1976 | Diggs | 74/572 |
| 4,035,658 | 7/1977 | Diggs | 290/55 |
| 4,035,659 | 7/1977 | Jeppson | 322/4 |

FOREIGN PATENT DOCUMENTS 60311 2/1912 Austria .......................................... 322/4

OTHER PUBLICATIONS

"Energy On Call", Casazza et al., IEEE Spectrum, Jun. 1976, pp. 45-48.

Primary Examiner—Gene Z. Rubinson
Assistant Examiner—John W. Redman
Attorney, Agent, or Firm—Cushman, Darby & Cushman

[57] ABSTRACT

Electric solar or windpowerplant with flywheel battery in which the electric generator is in the form of a d.c. generator, electrically connected to brushless d.c. motors switched in parallel which can also act as generators and each of which is coupled to a flywheel.

4 Claims, 1 Drawing Figure

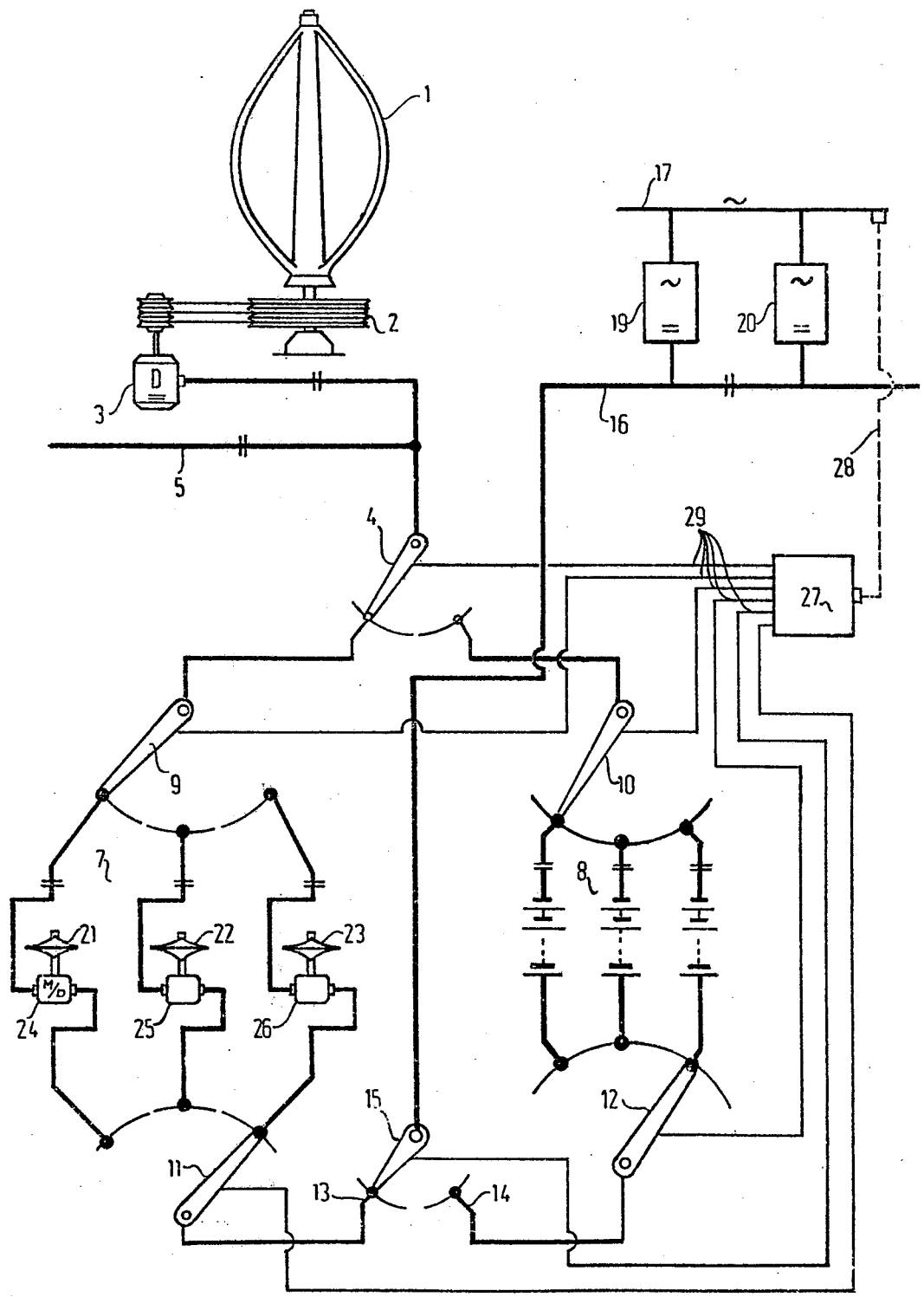

PLANT FOR GENERATING AND ACCUMULATING ELECTRIC ENERGY WITH THE AID OF WIND POWER OR SOLAR ENERGY

The invention relates to a plant for accumulating energy that can be extracted transitorily, which plant comprises one energy converter coupled to an electric machine.

The invention furthermore relates to a plant for generating electric energy with the aid of wind power, comprising at least one windmill coupled to a d.c. generator or to an a.c. generator with possibilities of rectification. The invention also relates to plants which permit direct or alternating current to be generated by means of solar energy.

The variability of the wind poses a problem in such plants. Sufficient electric energy can be generated at times of hard or stormy wind, but part of this energy must be stored for periods during which little or no wind is available. According to the invention, this is accomplished by having the plant comprise a number of brushless d.c. motors or hysteresis motors switched in parallel and connected to flywheels, collectively forming a flywheel battery in which a temporary excess of electric energy can be accumulated.

Solar radiation is just as variable as the wind. A certain amount of energy can be collected at times of a clear sky and a great deal of sunshine, but the available energy can suddenly be greatly reduced at times of an overcast sky and of light incidence at a low angle. At such times, the plant is accordingly connected to a flywheel battery as described in the preceding paragraph.

This allows energy to be made available in a reliable manner to the consumer network even during periods of weak wind or sun. This aim is attained by causing each brushless d.c. motor or hysteresis motor to start functioning as a generator when the wind fails. Additional security can be obtained in the power supply by providing an electric accumulator battery, connected in parallel to the battery of flywheels. The energy is stored in a high-grade form in all cases.

Each battery is preferably furnished with a switch for distributing the energy which is to be accumulated over the battery units, and with a separate switch for the individual extraction of energy from these battery units. Such switches can be provided in the form of double-pole switches.

The greatest profit will be derived from the invention if not just one windmill generator or solar battery is connected to the input switch of a battery, but a number of d.c. generators or other sources of direct current connected in parallel and coupled to a number of windmills or solar-energy stators, all of which are situated in an area where, according to meteorological statistical data, the same wind-velocity or solar-energy spectrum may be expected. Especially in level regions or at sea, there is the possibility of selecting a fairly large area comprising several square kilometers, where all windmills and/or solar centres can be connected in parallel to the accumulator battery, on account of the regionally almost identical wind velocity or solar energy, so that the d.c. voltage with which the battery is supplied will equally be substantially uniform.

In order to allow the required a.c. voltage to be supplied to the consumer network, the power output switch is connected to this network through one or more variable input voltage d.c.-a.c. converters.

In all atmospheric conditions, an automatic regulator provides the proper adjustment—depending on the mains voltage and the frequency which are to be constantly controlled—for the switches and change-over-switches, so that the mains voltage and frequencies remain constant within the normal tolerances. The principle of the invention is also applicable to haulage and hoisting machines, railway trains, trams, buses, trolley buses etc.

An example of embodiment of the invention will be explained in further detail on the basis of the following FIGURE.

In this FIGURE, 1 represents a Darrieus windmill 1 connected by means of a transmission 2 to a d.c. generator 3. A change-over switch 4 allows the energy supplied by 3, as well as the energy from windmills in the same area which is supplied along the cable 5, to be connected either to the flywheel battery 7 or to the d.c. accumulator battery 8. Each battery is provided with a multipole input change-over switch 9 and 10 respectively, change-over switches 11 and 12 being provided at the respective output. The corresponding output terminals 13 and 14 are connected by means of a change-over switch 15 to the d.c. network 16. The a.c. network 17 and the aforementioned network 16 are interconnected by a number of standard d.c.-a.c. converters, e.g. in the form of variable input voltage inverted rectifiers 19 and 20.

The flywheel battery consists of a number of flywheel rotors 21, 22 and 23, each of which is equipped with an individual brushless d.c. motor or hysteresis motor 24, 25 and 26.

Reference 27 indicates a central regulator which, with the aid of a measuring line 28, measures the mains voltage in the network 17 and which, depending on the results of measurement and via the pulse lines 29, places the change-over switches 4 and 15, as well as the switches 9, 10, 11 and 12, in the proper position.

Similar diagrams can naturally be set up also for propeller-type wind turbines, a.c. transforming generators having a fixed or variable speed of rotation and all types of electric power generators using solar radiation as their primary source of energy. Where the terms "wind", "windmill(s)" and "wind velocity" respectively are used in claim 13 hereinafter, they should be understood also to refer to "solar", "centre(s) of sunshine" and "spectrum of solar energy", respectively.

I claim:
1. A plant, connected to at least one electric machine coupled to an energy converter, for storing energy that can be extracted transitorily comprising:
   a plurality of reversible brushless DC motors capable of operation in a DC generator mode;
   a plurality of flywheels respectively mechanically coupled to said DC motors to collectively form a flywheel battery in which temporary excess electric energy may be accumulated and stored in mechanical form;
   means, including at least one DC-to-AC converter, switchably connected to said flywheel battery, for converting said mechanically stored excess electric energy to an AC electric form and adapted for connection to an AC power network;
   an accumulator battery having a plurality of battery units switchably connected to said at least one DC-to-AC converter; said at least one DC-to-AC converter including at least one variable input voltage inverted rectifier;

first switch means for alternatively electrically connecting the inputs of said accumulator battery and said flywheel battery to said electric machine;

second switch means for alternatively electrically connecting the outputs of said accumulator battery and said flywheel battery to said at least one DC-to-AC converter;

third switch means for alternatively connecting the inputs of said DC motors to said electric machine when said flywheel battery is connected to said electric machine in order to distribute the energy to be stored over said flywheel battery flywheels;

fourth switch means for alternatively connecting the inputs of said accumulator battery units to said electric machine when said accumulator battery is connected to said electric machine, in order to distribute the energy to be stored over said accumulator battery units;

fifth switch means for connecting the outputs of said DC motors to said at least one DC-to-AC converter when said flywheel battery is connected to said DC-to-AC converter, in order to alternatively extract said stored energy from said flywheels;

sixth switch means for connecting the outputs of said accumulator battery units to said at least one DC-to-AC converter when said accumulator battery is connected to said DC-to-AC converter, in order to alternatively extract said stored energy from said accumulator battery units; and an automatic regulator means, including a measuring line and responsive to the mains voltage in said AC power network, for controlling said first, second, third, fourth, fifth and sixth switch means so as to maintain said mains voltage at a substantially constant level.

2. The invention described in claim 1 further comprising a plurality of energy converters and a plurality of electric machines, wherein said energy converters comprise windmills and each of said electric machines is coupled to one of said windmills;

each of said electric machines being parallel connected to said first switch means; and said windmills being located in areas having substantially similar wind velocity characteristics.

3. The invention described in claim 1 wherein said brushless DC motors comprise hysteresis type brushless DC motors.

4. The invention described in claim 2 wherein said brushless DC motors comprise hysteresis type brushless DC motors.

* * * * *